United States Patent
Pohl et al.

(10) Patent No.: US 8,954,968 B1
(45) Date of Patent: Feb. 10, 2015

(54) MEASURING BY THE KERNEL THE AMOUNT OF TIME A MONITORED THREAD SPENDS IN A QUEUE IN ORDER TO MONITOR SCHEDULER DELAYS IN A COMPUTING DEVICE

(75) Inventors: William N. Pohl, Morgan Hill, CA (US); Suhas Suhas, Sunnyvale, CA (US); Alon Ronen, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 649 days.

(21) Appl. No.: 13/197,589

(22) Filed: Aug. 3, 2011

(51) Int. Cl.
*G06F 9/46* (2006.01)
*G06F 11/34* (2006.01)
*G06F 9/48* (2006.01)

(52) U.S. Cl.
CPC ........ *G06F 11/3409* (2013.01); *G06F 11/3419* (2013.01); *G06F 2209/508* (2013.01); *G06F 9/4843* (2013.01)
USPC .......................................... 718/100; 718/103

(58) Field of Classification Search
CPC ......... G06F 9/542; G06F 9/50; G06F 9/5027; G06F 2209/508; G06F 2201/88; G06F 9/4843; G06F 11/3419; G06F 11/3409; G06F 11/3466; G06F 11/3476; G06F 2201/81; G06F 2201/865; G06F 2201/87
See application file for complete search history.

(56) References Cited

U.S. PATENT DOCUMENTS

| 6,105,053 | A   | * | 8/2000  | Kimmel et al.          | 718/105 |
|-----------|-----|---|---------|------------------------|---------|
| 6,665,716 | B1  | * | 12/2003 | Hirata et al.          | 709/224 |
| 7,210,146 | B2  | * | 4/2007  | Hsieh                  | 718/103 |
| 8,122,006 | B2  | * | 2/2012  | de Castro Alves et al. | 707/713 |
| 2004/0117791 | A1 | * | 6/2004  | Prasad et al.          | 718/100 |
| 2004/0139433 | A1 | * | 7/2004  | Blythe et al.          | 718/100 |

* cited by examiner

*Primary Examiner* — Mengyao Zhe
*Assistant Examiner* — Caroline H Arcos
(74) *Attorney, Agent, or Firm* — Shumaker & Sieffert, P.A.

(57) ABSTRACT

In general, techniques of this disclosure relate to measuring scheduling performance of monitored threads in an operating system with improved precision. In one example, a method includes inserting, by an operating system kernel, a monitored thread into a queue comprising one or more threads and recording an insertion time that the monitored thread is inserted into the run queue; receiving, by the kernel, an event to remove the monitored thread from the run queue; responsive to receiving the event, determining, by the kernel, an amount of time that the monitored thread is stored on the run queue based on the insertion time and a removal time at which the monitored thread was removed from the run queue; and when the amount of time the monitored thread is stored on the run queue is greater than or equal to a specified threshold, sending a notification to a notification listener.

15 Claims, 4 Drawing Sheets

MEASURING BY THE KERNEL THE AMOUNT OF TIME A MONITORED THREAD SPENDS IN A QUEUE IN ORDER TO MONITOR SCHEDULER DELAYS IN A COMPUTING DEVICE

TECHNICAL FIELD

The invention relates to operating systems and, more particularly, to scheduling tasks within operating systems.

BACKGROUND

A computing device typically executes software, referred to as an "operating system" that is responsible for providing an interface between hardware of the computing device and application software. The operating system also generally provides common services for execution of the application software. The operating system may include a number of different components for providing the interface between the hardware and the application software, such as a kernel component, a networking component, a security component and a user interface component. The kernel component (which is often referred to as the "kernel"), may represent the core component that manages or otherwise controls the interface between application software and the hardware of the computing device. The kernel manages the execution of application software by the underlying hardware, instantiating or otherwise creating processes, allocating memory and other hardware resources for use by the processes, establishing priorities for the processes, loading program instructions into memory and scheduling execution of the loaded instructions associated with the process by the underlying hardware.

Processes executing on a computing device may represent executing instances of computer programs. A scheduler component of an operating system is responsible for scheduling the one or more processes for execution. Schedulers of some operating systems may also provide support for multithreading. Schedulers of multiprogramming operating systems may apply time-division multiplexing techniques that enable a processor to execute multiple different threads of a process such that a particular thread is executed for a specified period of time before the operating system selects a different thread for execution. Some operating system may further include data structures such as run queue to schedule and further prioritize different threads for execution. The operating system may also include a sleep queue to store inactive threads that are not presently scheduled for execution. As applications are executed by a processor, the operating system may switch threads between the run queue and sleep queue based on application and operating system instructions.

The performance of a computing device is dependent on, among other things, the number of executing processes and threads, the type of operations performed by each executing process or thread, and the implementation of operating system itself. In some examples, computing device performance problems may be difficult to detect and therefore solve when a large number of possible root causes may affect system performance. Failure to quickly and easily identify performance issues of a computing device may negatively affect debugging efforts and product development processes.

SUMMARY

In general, techniques of this disclosure relate to measuring scheduling performance of monitored threads in an operating system with improved precision. The disclosure further includes techniques that enable a scheduler of an operating system to re-prioritize monitored threads when scheduling performance does not meet pre-defined performance thresholds. In one aspect of the disclosure, techniques are described by which the operating system allows maximum delay times to be assigned to individual threads. The maximum delay times may be assigned, for example, by user-level application software and that each delay time specifies an amount of time that a corresponding the thread of execution may remain on a run queue before being selected for execution. Furthermore, the operating system may include additional mechanisms for more precisely measuring and reporting delay times within the kernel on a per-thread basis as designed by the user-level application software. For example, a scheduler of the kernel includes monitoring logic that records an insertion time when the scheduler initially inserts into the run queue a thread that has be designated for performance monitoring. At a later time when the kernel removes the thread from the run queue for execution, the monitoring logic may further determine and record the amount of time the thread was stored on the run queue. If the amount of time that the thread has been stored on the run queue exceeds the maximum delay time, the monitoring logic may generate an event. The event may, in some examples, cause other components of the operating system to re-prioritize one or more monitored threads and trigger a reporting mechanism that indicates that a performance threshold, e.g., maximum delay time, has been exceeded.

The monitoring logic integrated within the kernel may allow quantities of time required for other system events, such as hanging interrupts or memory allocations, to more readily be accounted for when determining the measured time that a thread is stored on the run queue. This may provide more precise measurements of the actual time that a thread is stored on the run queue. Moreover, because the techniques may provide more accurate time measurements, the operating system may more efficiently re-prioritize threads and identify possible problems, when the time a thread is stored on the run queue exceeds a maximum delay time.

Techniques of the present disclosure may also be applied to a sleep queue that stores one or more inactive threads. In this way, techniques of the present disclosure may be used to identify and respond to excessive sleep times. Because aspects of the present disclosure are applied in kernel space, individual amounts of time that a thread spends on a run queue and a sleep queue can be measured separately thereby providing more granular measurements of system performance. More granular measurements of system performance may enable to the scheduler to provide improved and more reliable response times for monitored threads by re-prioritizing monitored threads as necessary. Techniques of the present disclosure may further be implemented with a smaller resource footprints thereby improving system performance.

In one embodiment, a method includes inserting, by an operating system kernel executing on the computing device, a monitored thread into a queue comprising one or more threads and recording an insertion time that the monitored thread is inserted into the queue; detecting, by the kernel of the operating system executing on the computing device, an event to remove the monitored thread from the queue; responsive to receiving the event, determining, by the kernel executing on the computing device, an amount of time that the monitored thread is stored on the queue based on the insertion time and a removal time at which the monitored thread was removed from the queue; and when the amount of time the monitored thread is stored on the queue is greater than or equal to a specified threshold, sending a notification to a notification listener.

In one embodiment, a computing device includes: a control unit having one or more hardware-based microprocessors; and an operating system executable by the microprocessors to provide an operating environment for a user software application, wherein the operating system comprises a scheduler module and a monitoring module executing within a kernel space of the operating system, wherein the scheduler module inserts a monitored thread of the user software application into a queue comprising one or more threads and records an insertion time that the monitored thread was inserted into the queue; wherein the scheduler module of the operating system detects an event to remove the monitored thread from the queue; wherein, responsive to the scheduler module receiving the event, the monitoring module of the operating system determines an amount of time that the monitored thread is stored on the queue based on the insertion time and a removal time at which the monitored thread was removed from the queue; and wherein when the amount of time the monitored thread is stored on the queue is greater than or equal to a specified threshold, the monitoring module send a notification to a notification listener.

In one embodiment, system includes: an operating system; a software resource; and a control unit configured to execute the operating system wherein: an application programming interface (API) of the operating system is configured to receive an event from the software resource that indicates the software resource includes a monitored thread; a monitoring module of the operating system is configured, responsive to receiving the event via the API, to modify a thread structure of the monitored thread, wherein modifying the thread structure causes the monitoring module to determine an amount of time that the monitored thread is stored on a queue based on an insertion time that the monitored thread is inserted into the queue and a removal time at which the monitored thread was removed from the queue; and wherein the monitoring module of the operating system is configured to send a notification to a notification listener when the amount of time the monitored thread is stored on the run queue is greater than or equal to a specified threshold.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
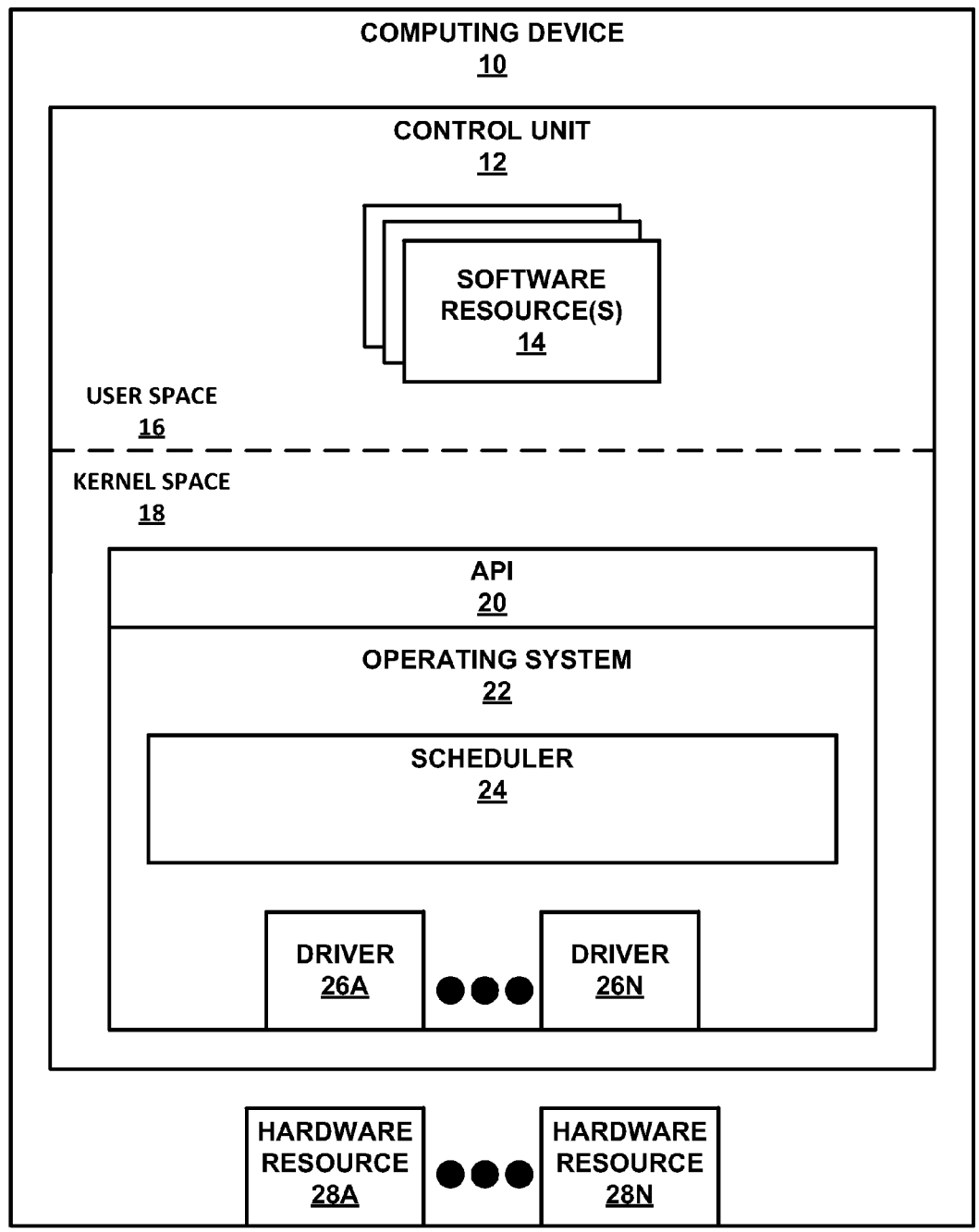
FIG. 1 is a block diagram illustrating an example computing device that implements the monitoring and prioritization techniques described in this disclosure.

FIG. 1 is a block diagram illustrating an example computing device 10 that implements the monitoring and prioritization techniques described in this disclosure. Computing device 10 may be a personal computer, a laptop computer, a handheld computer, a mobile telephone, a server, a workstation, an intermediate network device, a data storage system, a supercomputer, a mainframe computer, a device built into a vehicle such as a truck, car, aircraft, watercraft, spacecraft, or other type of electronic device. Computing device 10 may also be any one or more of a number of network devices, including a router, a switch, secure socket layer (SSL) acceleration device, a transport layer security (TLS) accelerator device, a virtual private network (VPN) accelerator device, a SSL-VPN accelerator device, a hub, a wide area network (WAN) acceleration (X) device (which is often referred to as a "WX device"), or any other network device that includes limited resources and is capable of executing multiple tasks, as will be explained in further detail below.

As shown in the example of FIG. 1, computing device 10 includes a control unit 12 and a plurality of hardware resources 28A-28N ("hardware resources 28"). Control unit 12 may generally represent hardware, which in some instances may execute software in the form of instructions stored to a computer readable medium. For example, control unit 12 may comprise any combination of one or more of processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor executes to perform the functionality described herein, including the functionality attributed to the techniques of this disclosure.

In this respect, control unit 12 comprises a plurality of processing elements. The processing elements include one or more of a general purpose processor, a programmable processor and central processing unit (CPU), more dedicated processing elements, such as a network processing unit (NPU) and graphics processing unit (GPU), entirely dedicated processing elements, such as a field programmable gate array (FPGA) and an application specific integrated circuit (ASIC), or any combination of the above.

Control unit 12 provides an operating environment for a plurality of software resources 14, one or more Application Programming Interfaces (APIs) 20, an operating system 22, a scheduler 24, and a plurality of drivers 26A-26N ("drivers 26"). Operating system 22 may include one or more pro-cesses, threads, event handling processes, or any other task typically executed by the processing elements represented as control unit 12. Operating system 22 generally represents software executed by the processing elements represented as control unit 12 that provides an interface between hardware resources 28A-28N and software resources 14. This interface, as presented by operating system 22, typically involves management and coordination of activities or tasks and the sharing of resources, such as software resources 14 and hardware resources 28.

In some examples, operating system 22 may provide one or more APIs 20 that expose and provide access to functionality provided to software resources 14 by operating system 22. For instance, APIs 20 may provide specifications of functions and expose data structures provided by operating system 22 to software resources 14. Software resources 14 may invoke such functions or modify the data structures in order to cause operating system 22 to perform various operations. In this way, APIs 20 enable software resources 14 to interact and interface with hardware, such as hardware resources 28. As shown in FIG. 1, software resources 14 may include any software program or module executable by control unit 12. For example, software resources 14 may include modules comprising instructions that cause computing device 10 to transfer, drop, encrypt or otherwise process network packets. In other examples, software resources 14 may be a web browser application, software library, or word processor application.

Each of hardware resources 28 generally represents a hardware component that performs one or more particular functions or operations. Hardware resources may be general resources such as physical memory or input/output devices, or specialized hardware components. For example, hardware resource 28A may comprise dedicated SSL accelerator hardware that only performs SSL acceleration to accelerate forwarding of packets requiring SSL encryption or decryption, or the successor of SSL, TSL encryption and decryption (as SSL acceleration devices may be referred to as SSL acceleration devices despite implementing the successor to SSL, TSL). In any event, each of hardware resources 28 performs one or more particular functions or operations, including SSL acceleration, TSL acceleration, WAN acceleration (X) or WX, compression, intrusion detection, and intrusion detection and prevention (IDP). Other examples of hardware resources include a modem, memory, output device such as a monitor, or input device such as a mouse or keyboard.

Drivers 26 generally represent software modules that present an interface with which other software, such as software resources 14 or operating system 22 may send and receive information to hardware resources 28. Typically, each of drivers 26 correspond to a different one of hardware resources 28, where operating system 22 may load drivers 26 during boot-up or power-up so as to initialize and enable each of hardware resources 28 for use by software, such as software resources 14 and operating system 22.

As shown in FIG. 1, various software components executing on control unit 12 may be logically separated into user space 16 and kernel space 18. User space 16 and kernel space 18 represent logical divisions of virtual memory provided by operating system 22. In particular, virtual memory addresses of kernel space 18 are reserved for drivers 26, kernel extensions, and the execution of the kernel itself. Virtual memory addresses of user space 16 are used by software components that interact with the kernel such as libraries and software resources 14. In this way, user processes execute in a logically separate area of virtual memory from the kernel to provide, for example, security and performance advantages.

As further shown in the example of FIG. 1, operating system 22 includes a scheduler 24 that, in one example, implements aspects of the techniques described in this disclosure to promote more efficient scheduling of tasks within network device 10. In general, operating system 22 includes a kernel, which includes core components of the operating system such as scheduler 24. Scheduler 24 is a software component of operating system 22 that schedules execution of threads and processes of software resources 14 so as to avoid, and potentially eliminate, conflicts resulting from insufficient resources, such as hardware resources 28 and software resources 14. As will be later described in FIG. 2, scheduler 24 may include one or more data structures such as a run queue and a sleep queue that store data associated with threads of execution for software resources 14. Scheduler 24 of operating system 22 may also provide support for multiprogramming. In such examples, scheduler 24 may apply time-division multiplexing techniques that enable control unit 10 to execute multiple different threads such that a thread is executed for a specified period of time or until an event that causes operating system 22 to select a different thread for execution. Scheduler 24 may implement any number of scheduling techniques separately or in combination such as Round-Robin scheduling, priority scheduling, lottery scheduling, shortest thread next scheduling, or guaranteed schedule to schedule threads. The term thread is used herein to refer to any sequence of executable instruction managed by the operating system. For example, although techniques of the present disclosure are described using threads, the techniques of this disclosure are similarly applicable to processes or individual tasks.

Figure 2:
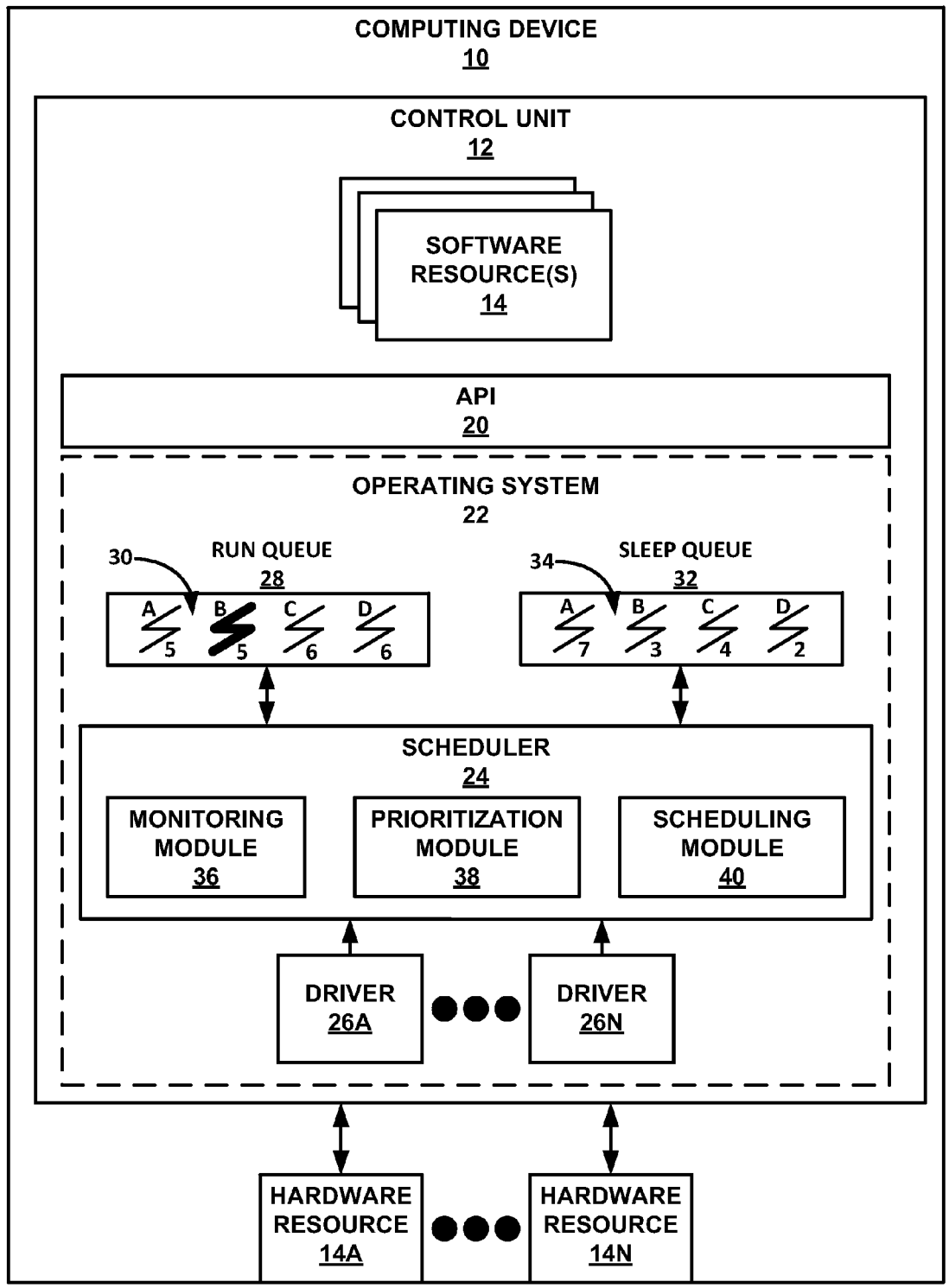
FIG. 2 is a block diagram illustrating in further detail an example operating system that implements techniques described in this disclosure.

In one example, a scheduler 24 may implement Round-Robin priority scheduling. In such an example, each thread may be assigned a priority and stored in a queue, e.g., a run queue as shown in FIG. 2, discussed below. Furthermore, two or more threads may each have the same priority thereby resulting in groups of threads that are assigned different priorities. Scheduler 24, in the current example, executes higher priority threads before lower priority threads. If multiple threads are each assigned the same priority, scheduler 24 will execute a first thread of the specified priority for a defined period of time or "time slice." After the first thread has executed for the duration of the time slice, scheduler 24 performs a "context switch" to select a second thread of the same priority from the run queue for execution and further places the first thread at the end of the run queue. Thus, scheduler 24 selects and executes threads stored in the run queue in a First-In, First-Out (FIFO) manner. In this way, each thread assigned a particular priority is provided a specified time period of execution thereby ensuring fairness by scheduler 24 while enabling the user and/or operating system designer to prioritize groups of threads.

In some instances, threads may be assigned a "real-time" priority. Generally, threads that are not assigned a real-time priority are executed for a specified time-slice according to the previous example. In contrast, real-time threads run to completion. In other words, a real-time thread may run uninterrupted until the thread has no further operations to complete. While real-time threads may provide for improved performance, such threads may generate unintended or undesired side effects in the operation of operating system 22. For example, non-real-time threads may be starved of resources. System responsiveness may be negatively impacted.

Techniques of the present disclosure overcome such unintended or undesired side effects of real-time threads by enabling software resources 14 to direct operating system 22 to classify individual threads as "monitored threads." In some instances, aspects of the present disclosure enable a user and/or application-level software module to classify a thread as a monitored thread. Although techniques of the present disclosure are described in some examples as using a subset of monitored threads, in other examples, all threads of a computing device may be monitored using techniques of the present disclosure. For instance, in some examples, all threads may record insertion times into and removal times from a queue. A monitored thread may be a thread that is sensitive to response times such adverse system performance may occur if the execution of the monitored thread is delayed. When a thread is classified as a monitored thread, scheduler 24 may, for example, precisely measure the amount of time that the monitored thread is stored on a run queue before being selected for execution by the processor. In such examples, the kernel may initially record an insertion time when the monitored thread is inserted into the run queue. When the kernel later removes the monitored thread from the run queue to execute the thread, the kernel may determine a removal time. If the time that the monitored thread has been stored on the run queue is greater than or equal to a threshold value, operating system 22 may generate an event. In some examples, the event may be a notification to a logging mechanism such as a listener.

In other examples, the event may cause operating system 22 to re-prioritize a monitored thread that has been stored on the run queue if the amount of time the monitored thread is stored on the queue is greater than or equal to a specified threshold. For instance, a group of four threads may each be assigned a priority level. One of the threads in the group of four threads may be a monitored thread such that the monitored thread's time stored on the run queue is measured by the kernel. If the amount of time the monitored thread is stored on the queue is greater than or equal to a specified threshold, scheduler 24 may re-schedule the monitored thread such that monitored thread is prioritized ahead of all other threads of the same priority level. In this way, the monitored thread will run (e.g., is selected from the run queue for execution by control unit 12) sooner than other threads of the same priority level if the kernel determines the monitored thread has been stored on the run queued for a time that is greater than or equal to a threshold. This technique enables scheduler 24 to re-schedule the monitored thread within its priority level for improved performance without changing the assigned priority level of the monitored thread or assigning a real-time priority to the monitored thread. Consequently, unintended or undesired side effects of prioritizing a thread as real-time are avoided using techniques of the present disclosure while providing improved performance for threads that require enhanced performance. Thus, aspects of the present disclosure may provide for granular measurements of time that threads are stored on a run queue and may further enable scheduler 24 to re-schedule monitored thread for improved system performance. Techniques of the present disclosure are further described in the following figures.

FIG. 2 is a block diagram illustrating an example computing device 10 further including queues 28, 32 and modules 36, 38, 40 that implement techniques described in this disclosure. As shown in FIG. 2, computing device 10 includes control unit 12 and hardware resources 14 as described in FIG. 1. Control unit 12 further includes software resources 14, API 20, and operating system 22 as described in in FIG. 1. Operating system 22 of FIG. 2 includes a run queue 28, sleep queue 32, scheduler 24 and drivers 26. Run queue 28 includes active threads 30A-30D ("active threads 30"). Sleep queue 32 includes inactive threads 34A-34D ("inactive threads 34"). Scheduler 24 further includes a monitoring module 36, a prioritization module 38, and a scheduling module 40. Operating system 22 further includes drivers 26 as shown in FIG. 1.

As shown in FIG. 2, operating system 22 may include run queue 28. Run queue 28 may be implemented as a priority queue that stores one or more active threads 30 waiting for execution by control unit 12. To execute an active thread, scheduling module 40 selects, e.g., active thread 30A from run queue 24, to run on control unit 12. Scheduling module 40 ensures each active thread 30 has a fair share of system resources of computing device 10 by running each active thread 30 for an equal period of time, e.g., a time slice. For example, active thread 30A, when selected for execution by scheduling module 40, is removed from run queue 28 and executed by control unit 12. In one example, an event such as an interrupt causes scheduling module 40 to remove active thread 30A from run queue 28 for execution by control unit 12. In such examples, the scheduling module 40 may detect the event. Detecting an event may include receiving an event from another hardware or software component, or determining the event has occurred within a hardware or software component. Once active thread 30A has been run by control unit 12 for an amount of time equal to the time slice, scheduling module 40 inserts the thread at the end of other threads of the same priority in run queue 28. Scheduling module 40 then removes the next thread from the front of run queue 28. In this way, active threads 30 are executed in a FIFO manner. Scheduling module 40 may select active threads 30 from run queue 28 from highest to lowest priority. For instance, scheduling module 40 may execute all active threads of higher priority before executing threads of lower priority. To ensure fairness, scheduling module 40 may in some examples, decay the priority of higher priority threads such that all threads are eventually executed by control unit 12.

Operating system 22 may further include a sleep queue 32. Sleep queue 32 may be implemented as a queue that stores one or more inactive threads 34A-D. In some examples, a thread may initially be stored on run queue 28 as an active thread. When the active thread is removed from run queue 28 and executed by control unit 10, an instruction included in the active thread may, when executed by control unit 10, cause scheduling module 40 to insert the active thread into sleep queue 32. When scheduling module 40 inserts the thread into sleep queue 32, the thread may be referred to an "inactive thread." Inactive threads 34, for example, remain on sleep queue 32 until an event occurs that causes scheduling module 40 to remove an inactive thread from sleep queue 32. For instance, an active thread may include a "sleep" instruction that, when executed by control unit 12, causes scheduling module 40 end execution of the thread and further insert the thread into sleep queue 32 for a specified period of time. The sleep command also causes scheduling module 40 to generate a timer object for the specified period of time. When the timer object expires after the specified period of time, the timer object sends a signal or event to scheduling module 40 which removes the thread from sleep queue 32 and inserts the thread into run queue 32 for execution.

As shown in FIG. 2, scheduler 24 of operating system 22 includes a scheduling module 40. Scheduling module 40 may implement techniques for inserting threads into and removing threads from run queue 28 as previously described with respect to run queue 28. Schedule module 40 may further implement techniques for inserting threads into and removing threads from sleep queue 32 as previously described with respect to sleep queue 32. For instance, scheduling module 40 may implement any number of scheduling techniques separately or in combination such as Round-Robin scheduling, priority scheduling, lottery scheduling, shortest thread next scheduling, or guaranteed schedule to schedule threads.

Scheduler 24 may also include prioritization module 38. Prioritization module 38 may change the priorities of threads stored in run queue 28 and sleep queue 32. For instance, scheduling module 40 may receive an event from monitoring module 36 that an active thread 30D has been stored on run queue 28 for a time that exceeds a specified threshold. In the current example, prioritization module may, for example, increase the priority of active thread 30D from 6 to 5. Prioritization module 38 may further decrease the priorities of one or more threads as well.

Scheduler 24 further includes monitoring module 36. Monitoring module 36 enables a user and/or a software or hardware component to monitor one or more threads in run queue 28 and/or sleep queue 32. For instance, a user may wish to designate active thread 30B as a "monitored thread" because active thread 30B is sensitive to delays of scheduler 24. When a thread is sensitive to delays, techniques of the present disclosure enable a user to monitor the thread to detect delays and, in some examples, cause scheduler 24 to re-prioritize the thread when delays occur.

In the past, if a user wished to determine whether a scheduler was providing satisfactory scheduling performance, the user would typically implement the following example pseudocode in user space code of a thread:

```
1    void do_work (int sleeptime) {
2       int start_time;
3       int end_time;
4       int TOLERANCE = 200;
5
6       start_time = get_current_time( );
7       sleep(sleeptime);
8       end_time = get_current_time( );
9
10      if (end_time − start_time > (sleeptime / 1000) +
11          TOLERANCE) {
12          generate_event ( );
13      }
14   }
```

As shown in line 6, the user includes an instruction to store a timestamp of the current time prior to the sleep command. When the line 7 is executed, the thread is stored on a sleep queue for a number of time units specified by sleeptime. For instance, a number of time units specified by sleeptime may be 2 seconds. Additionally, the scheduler may generate a timer object that is initiated to expire after the specified number of time units. When the timer object expires, the scheduler removes the thread from the sleep queue and inserts the thread into the run queue. The instruction at line 8 then captures the current time after the thread has been removed from the sleep queue. At line 10, the scheduler then determines whether the amount of time the thread was stored on the sleep queue exceeded the specified sleeptime plus an acceptable TOLERANCE value that corresponds to an acceptable margin of error. In one example, an acceptable TOLERANCE value may be 200 millisends. For example, pseudocode at line 10 may determine whether the timer object was delayed due to a problem, thereby causing the thread to be moved from the sleep queue to the run in an amount of time that exceeds the specified sleeptime plus some acceptable margin of error.

Aspects of the present disclosure overcome numerous disadvantages of past techniques for monitoring scheduling performance. For instance, the previous example measures time in user space code and consequently may not be able to discriminate between delays in scheduling performance that are due to normal operation of the operating system and delays due to potential problems that require further identification and solutions. For instance, after the execution of line 7, i.e., the thread has been moved from the sleep queue to the run queue but prior to recording a current time for end_time, other system events may occur such as system interrupts or page faults. The time required for the operating system to perform, e.g., a memory allocation in response to a page fault, may therefore be included in the calculation performed at line 10 that is intended to determine if the timer object was delayed due to a problem. Because a memory allocation in response to a page fault constitutes a normal operation of the operating system, the implemented pseudocode may incorrectly include the additional required time to allocate the memory in the measurement at line 10 that is intended to measure if the timer object associated with the thread is delayed to an actual problem in the operating system. In other words, past techniques failed to discriminate between normal operating system delays and actual scheduling performance problems, thereby some reporting scheduling performance delays as problems even when the operating system was performing normally.

Techniques of the present disclosure overcome such measurement problems and may further provide techniques to re-prioritize threads that experience delays. According to techniques of the present disclosure, a thread may be initially designated as a "monitored thread" by a user and/or software or hardware component. Scheduler 24 may monitor the amount of time a monitored thread is stored on the sleep queue and/or run queue. In some examples, scheduler 24 may further re-prioritize monitored threads in response to changes in system performance.

Techniques of the present disclosure enable the user and/or software or hardware component to designate a thread as a monitored thread via API 20 provided by operating system 22. For instance, API 20 may include a function call of operating system 22 that may be invoked by a thread. In one example, the function call may further receive one or more parameters. The parameters may, for example, include data that indicates that a thread is a monitored thread and a threshold value that specifies a maximum amount of time that a thread may be stored on a run queue before execution. In other examples, a parameter may include a threshold value that specifies a maximum amount of time that a thread may be stored on a sleep queue before execution.

In one example, the setrlimit( ) function call of a POSIX-compliant operating system may be used to enable the user and/or software or hardware component to designate a thread as a monitored thread. For instance, the function call setrlimit (RLIMIT_RQ, &limit), when called by a thread includes 2 parameters. The first parameter, RLIMIT_RQ, may include a value that instructs operating system 22 to monitor the thread. The second parameter, &limit, is a threshold value that specifies a maximum amount of time that the thread may be stored on the run queue. For instance, the threshold value may specify that a scheduler delay of 300 milliseconds is an acceptable time.

When a thread invokes the function that causes operating system 22 to monitor the thread, e.g., setrlimit (RLIMIT_RQ, &limit), operating system 22 executes one or more instructions that store the threshold value provided by, &limit, in the thread structure. A thread structure may be data that represents the thread and is stored by operating system 22. For instance, POSIX-compliant operating systems represent each thread as a thread structure called a task_struct. A task_struct is a data structure that represents a thread and further contains information about the thread. Techniques of the present disclosure store the threshold value provided by &limit in the thread structure. In addition, techniques of the present disclosure further store an indicator in the thread structure that causes operating system 22 to measure, e.g., the times that a thread is inserted into and removed from a run queue and/or sleep queue. For instance, the indicator may be a Boolean value that, when set to a value of true, causes monitoring module 36 of operating system 22 to monitor the thread.

As shown in FIG. 2, operating system 22 includes monitoring module 36. Monitoring module 36 monitors monitored threads stored in run queue 28 and sleep queue 32 according to techniques of the present disclosure. For instance, run queue 28 as shown in FIG. 2 includes active threads 30A-D. Run queue 28 further includes monitored thread 30B. Monitored thread 30B may be a thread for which a user invoked a function, e.g., setrlimit(RLIMIT_RQ, &limit).

In the current example, when monitored thread 30B is inserted into run queue 28, monitoring module 36 records an insertion time into the thread structure, e.g., task_struct, that represents monitored thread 30B. For instance, the current time may be recorded in milliseconds. At a later point in time, control unit 12 may perform a context-switch that causes scheduling module 40 to insert a currently executing thread into run queue 28 and further select monitored thread 30B for execution. When scheduling module 40 selects monitored thread 30B for execution, monitoring module 36 determines whether the thread structure that represents monitored thread 30B includes data that indicates monitored thread 30B is a monitored thread. If the data indicates monitored thread 30B is a monitored thread, monitoring module 36 may record a removal time in the thread structure that represents monitored thread 30B. The removal time represents a time that scheduling module 40 removes the thread from run queue 28 for execution by control unit 12.

Monitoring module 36, in some examples, determines an amount of time that monitored thread 30B is stored on run queue 28 based on the insertion time and removal time stored in the thread structure that represents monitored thread 30B. For instance, monitoring module 36 determines the difference between the removal time and the start time. In some examples, monitoring module 36 determines if the amount of time the monitored thread is stored on the queue is greater than or equal to a specified threshold. The threshold may be the threshold value specified by &limit. In one example, when the difference between the removal time and the start time is greater than or equal to the threshold value stored in the thread structure that represents monitored thread 30B, this may indicate a scheduler delay or potential problem in operating system 22.

If the difference between the removal time and the start time is greater than or equal to the threshold value stored in the thread structure that represents monitored thread 30B, monitoring module 36 may generate a notification. The notification may include but is not limited to data that indicates if the amount of time the monitored thread is stored on the queue is greater than or equal to a specified threshold, the difference between the removal time and the start time, and data usable to identify the monitored thread. Because the difference between the removal time and the start time is determined by monitoring module 36, which is included in operating system 22, more granular time measurements are possible. More granular time measurements may improve monitoring accuracy. In addition, because monitoring module 36 performs the measurement of time in kernel space, system events such as interrupts or memory allocations are omitted from the measured time that a thread is stored on the run queue thereby improving monitoring accuracy.

In some examples, monitoring module 36 sends the notification to prioritization module 38. Prioritization module 38 may include a notification listener that receives the notification. In response to receiving the notification, prioritization module may increase the priority of monitored thread 30B. In this way, techniques of the present disclosure may automatically respond to scheduler delays or other possible problems to improve response times of monitored threads.

In other examples, monitoring module 36 sends the notification to a logging module (not shown) that is implemented in software resources 14 and/or in operating system 22. The logging module may include a notification listener that receives the notification. Upon receiving the notification, the logging module may record data indicating that the notification was received, e.g., a log entry in a log. In this way, techniques of the present disclosure may notify a user of potential problems, e.g., scheduler delays, in scheduler 24 thereby allowing the user to respond to such problems.

Figure 3:
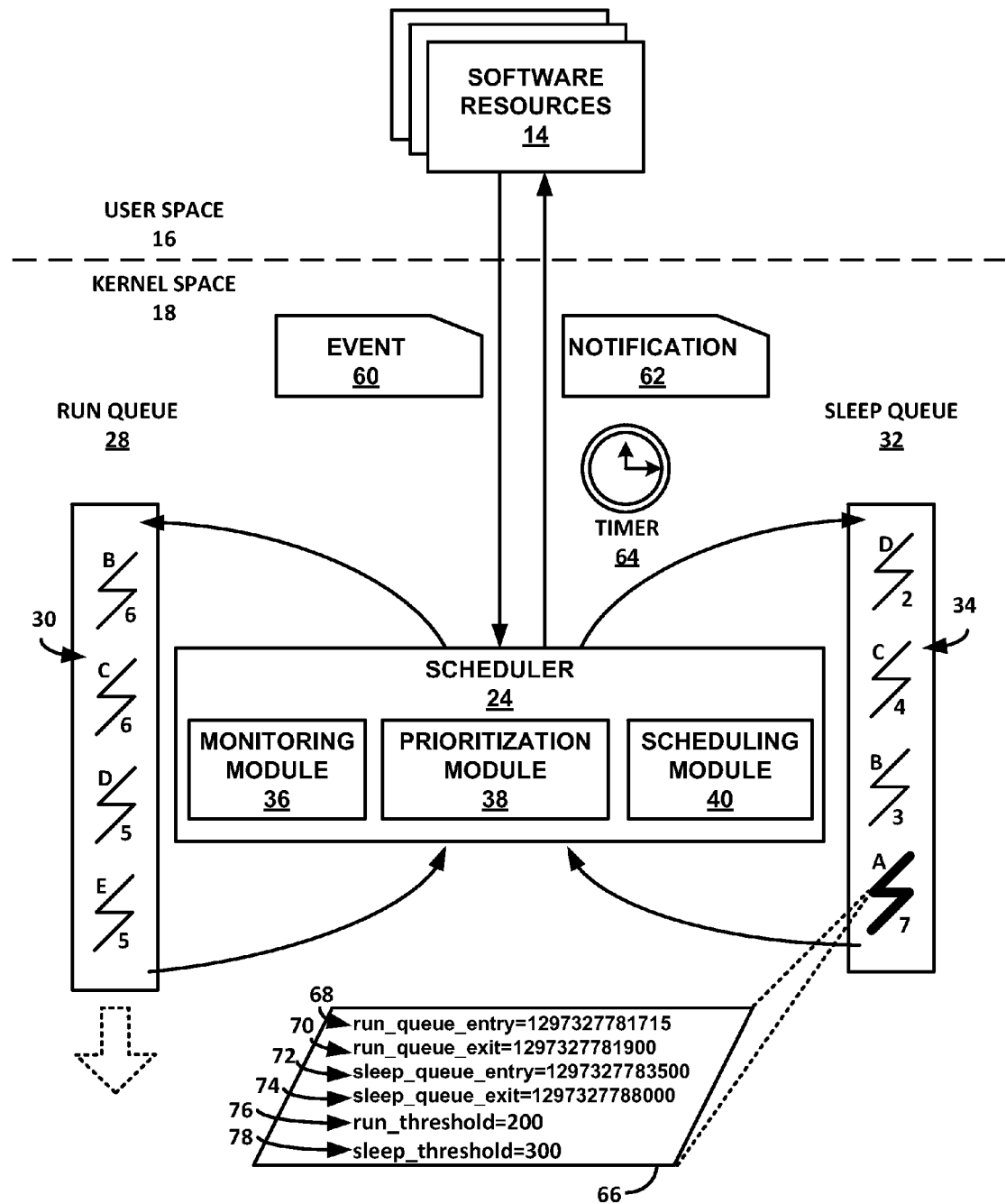
FIG. 3 is a conceptual diagram illustrating a scheduler that implements the monitoring and prioritization techniques described in this disclosure.

FIG. 3 is a conceptual diagram illustrating a scheduler 24 that implements the monitoring and prioritization techniques described in this disclosure. As described in FIG. 2, aspects of the present disclose provide techniques to measure the amounts of time a thread is stored on a run queue and/or sleep queue. Because techniques of the present disclosure are performed in kernel space, the techniques can separately and more granularly measure the amounts of time that a thread is stored on a run queue and/or sleep queue. For instance, past techniques to measure scheduling delays were performed within user space applications. Because user space applications are not permitted access to operating system data structures such as a run queue and a sleep queue, separate time measurements for amounts of time a thread is stored on the run queue and sleep queue were not possible with past techniques. Techniques of the present disclosure overcome such limitations.

FIG. 3 illustrates an example scheduler 24 that implements techniques of the present disclosure to separately monitor amounts of time that a thread is stored on a run queue and sleep queue. FIG. 3 includes user space 16 that further includes software resources 14 and kernel space 18 as shown in FIGS. 1 and 2. FIG. 3 also includes run queue 28, active threads 30, sleep queue 32, inactive threads 34, and scheduler 24 as shown in FIG. 2. Scheduler 24 further includes monitoring module 36, prioritization module 38, and scheduling module 40 as shown in FIG. 2.

In one example, a user may wish to use techniques of the present disclosure to monitor a thread and more specifically to separately monitor the amount of time the monitored thread is stored on run queue 28 and sleep queue 32. Active threads 30 are selected by scheduler 24 for execution and are inserted into run queue 28 to be later executed as described in FIGS. 1 and 2. As shown in FIG. 3, a user may wish to monitor inactive thread 34A and more specifically measure the amount of time thread 34A is stored on run queue 28 and sleep queue 32.

Initially, the user invokes two functions, setrlimit (RLIMIT_RQ, &limit) and setrlimit (RLIMIT_SQ, &limit) to cause scheduler 24 to monitor thread 34A. The first function call, setrlimit (RLIMIT_RQ, &limit), causes monitoring module 36 to store the threshold value of & limit in a run_threshold variable 76. A thread structure 66 representing thread 34A may include run_threshold variable 76. Later, monitoring module 36 may select the threshold value stored in run_threshold variable 76 when monitoring the amount of time thread 34A is stored on run queue 28. In some examples, thread structure 66 further includes a run queue monitoring variable (not shown) to store a flag that when set indicates thread 34A is being monitored. Monitoring module 36 may check this monitoring variable at later points in time to determine whether thread 34A is monitored. In examples that do not include a monitoring variable, the run_threshold value 76 may be set to, e.g., a negative value when the thread is not monitored and positive values will be interpreted by monitoring module 36 as threshold values. In this way, monitoring module 36 may determine a thread is not monitored if the value of the run_threshold 76 is negative.

In still other examples, when a thread invokes a function that causes operating system 22 to monitor the thread, e.g., setrlimit (RLIMIT_RQ, &limit), monitoring module 36 may store a thread identifier of the of the monitored thread in a data structure that includes thread identifiers of all monitored threads. When scheduler 24 later performs a context switch to enable another thread to run, monitoring module 36 may check the data structure to determine whether the thread is a monitored thread and therefore apply techniques of the present disclosure.

The second function call, setrlimit (RLIMIT_SQ, &limit), causes monitoring module 36 to store a threshold value of & limit in a sleep_threshold variable 78. Thread structure 66 representing thread 34A may include sleep_threshold variable 78. Later, monitoring module 36 may select the threshold value stored in sleep_threshold variable 76 when monitoring the amount of time thread 34A is stored on sleep queue 32. Thread structure 66 may also optionally include a sleep queue monitoring variable (not shown) to store a flag that may be set to indicate thread 34A is being monitored.

Thread 34A may be inserted into run queue 28 when thread 34A is initially instantiated. Monitoring module 36 determines that run_threshold variable 76 is set to 200 milliseconds and therefore is a monitored thread. Consequently, monitoring module 36 records an insertion time of 1297327781715 in run_queue_entry variable 68. The time of 1297327781715 may be, e.g., a Unix timestamp that represents the time that thread 34A is inserted run queue 28.

Scheduler 24 may later remove thread 34A from run queue 28 for execution by a control unit such as control unit 12. For instance, when scheduling module 40 removes thread 34A for execution on a control unit, monitoring module 36 determines that thread 34A is a monitored thread because run_threshold variable 76 includes a positive value, e.g., 200 milliseconds. Consequently, monitoring module 36 records a removal time of 1297327781900 in run_queue_exit variable 70. Monitoring module 36 further determines whether the difference between the removal time and the start time is greater than or equal to the threshold value stored in run_threshold variable 76. Because the difference between the values in run_queue_entry variable 68 and run_queue_exit variable 70 is less than 200 milliseconds, i.e., the value of run_threshold variable 76, monitoring module 36 does not generate a notification that if the amount of time the monitored thread is stored on the queue is greater than or equal to a specified threshold. Control unit 12 then executes thread 34A for a period of time equal to a specified time-slice before scheduler 24 inserts thread 34A back into run queue 28 and a new insertion time is recorded in run_queue_entry variable 68. In this way, each of threads 30 may be selected from run queue 28 for execution by a control unit and various threads may be monitored according to techniques of this disclosure.

In some examples, thread 34A may include instructions that cause scheduler 24 to insert thread 34A into sleep queue 32. For instance, POSIX-compliant operating systems include a sleep( ) function that when executed, causes scheduling module 40 of scheduler 24 to suspend execution of a thread, e.g., thread 34A, for a specified period of time. For instance, when the sleep( ) function is executed, an event 60 indicating the sleep( ) function and a number of time units to sleep thread 34A may be sent to scheduler 24. In addition, scheduling module 40 inserts thread 34A into sleep queue 32. Scheduling module 40 also generates a timer object 64. Timer object 64 is a data structure created by the operating system to "wake up" a thread on sleep queue 32 upon expiration of a specified time period. To wake up thread 34A, scheduling monitor 40, upon expiration of timer object 64, selects the sleeping thread 34A from sleep queue 32 and inserts the thread back into run queue 28. In the current example, timer object 64 is set to a number of time units specified in a parameter of the sleep command included in thread 34A.

In accordance with aspects of the present disclosure, techniques are provided to monitor the amount of time a thread is stored on a sleep queue. Thus, in the current example, when a sleep instruction of thread 34A is executed, scheduling module 40 inserts thread 34A into sleep queue 32. Monitoring module 36 further determines whether thread 34A is a monitored thread. For instance, monitoring module 36 determines whether sleep_threshold variable 78 includes a positive value. Because sleep_threshold variable 78 includes a positive value, thread 34A is a monitored thread. Consequently, monitoring module 36 records the current time that thread 34A is inserted into sleep queue 32 in sleep_queue_entry 72. The time of 1297327783500 may be, e.g., a Unix timestamp that represents the time that thread 34A is inserted sleep queue 32.

At a later time, timer object 64 expires and scheduling module 40 selects thread 34A from sleep queue 32. Monitoring module 36 determines whether thread 34A is a monitored thread by determining that the sleep_threshold variable 78 includes a positive value. Because sleep_threshold variable 78 includes a positive value, thread 34A is a monitored thread. Consequently, monitoring module 36 records the current time that thread 34A is removed from sleep queue 32 in sleep_queue_exit 74.

Monitoring module 36, in some examples, further determines the difference between the values of sleep_queue_entry 72 and sleep_queue_exit 74. Monitoring module 36 also calculates the sum of the value in sleep_threshold variable 78 and the initially specified amount of time from the sleep( ) function that thread 34A was instructed to sleep. In the current example example, monitoring module 36 generates a notification 62 because monitoring module 36 determines that the difference between the values of sleep_queue_entry 72 and sleep_queue_exit 74 is greater than the sum of the sleep_threshold variable 78 value and the initially specified sleep time in the sleep( ) function.

Monitoring module 36 may generate a notification 62 because the amount of time that thread 34A was stored on sleep queue 32 exceeded the sum of the threshold value and the specified sleep time in timer object 64. In such examples, a problem may exist in the system that caused timer object 64 and/or scheduling module 40 to be delayed in removing thread 34A from sleep queue 32 and inserting thread 32A into run queue 28. Monitoring module 36 may in some examples send notification 62 to a software resource in user space 16 such as a logging software resource. In other examples, monitoring module 36 may generate and send a notification to prioritization module 38. Prioritization module 38, in response, may increase the priority of thread 34A. In this way, techniques of the present disclosure may enable threads that are sensitive to delay to continue to perform responsively by changing the priorities of the threads.

Figure 4:
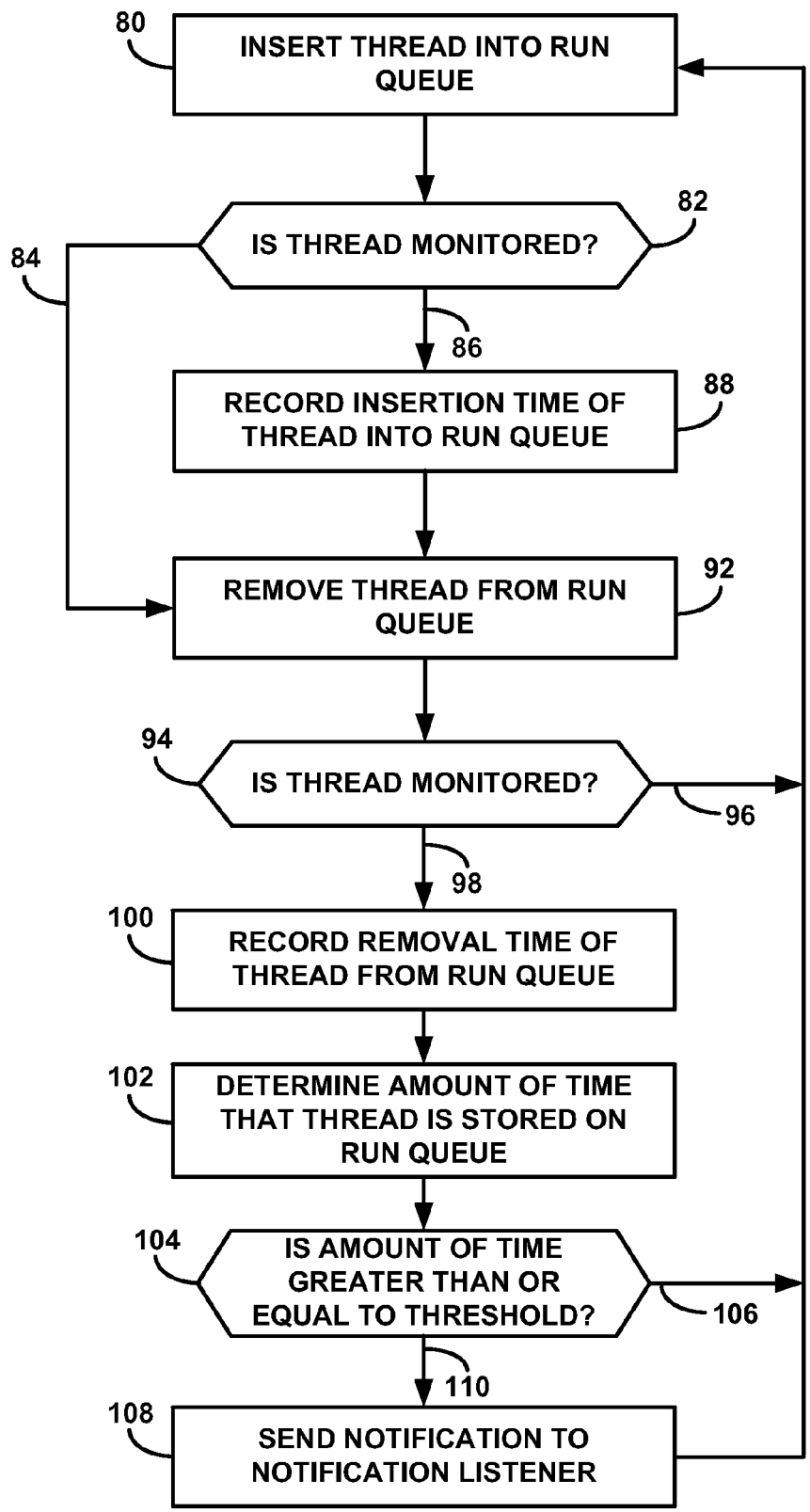
FIG. 4 is a flowchart illustrating an example operation of the operating system to monitor scheduler delays, in accordance with techniques of this disclosure.

FIG. 4 is a flow chart illustrating an example method to monitor scheduler delays, in accordance with techniques of this disclosure. The example method of FIG. 4 may be performed by scheduler 24 as shown in FIG. 2. Initially, a software resource of software resources 14 is instantiated as a thread 34A by control unit 12. In some examples, thread 34A may include one or more instructions that cause monitoring module 36 of scheduler 24 to monitor thread 34A according to techniques described in FIGS. 1-3. For instance, thread 34A may include instructions such as setrlimit (RLIMIT_RQ, &limit) and/or setrlimit (RLIMIT_SQ, &limit) as previously described that, when executed, modify the thread structure of thread 34A to indicate that thread 34A is monitored. In the current example, the amount of time that thread 34A is stored on run queue 28 is monitored.

When scheduler 24 inserts thread 34A into run queue 28 (80), monitoring module 36 determines whether thread 34A is monitored (82). Monitoring module 36, in one example, determines whether a run queue monitoring variable or sleep queue monitoring variable includes data that indicates thread 34A is monitored. In other examples, monitoring module 36 alternatively determines whether a run threshold variable of the thread structure representing thread 34A is a positive or negative value. If the value is zero or positive, the thread is monitored and if the value is negative, the thread is not monitored.

If thread 34A is monitored (86), monitoring module 36 records an insertion time of thread 34A into run queue 28 (88). If thread 34A is not monitored (84), no insertion time is recorded by monitoring module 36. At a later time, scheduling module 40 removes thread 34A from run queue 28 for execution by control unit 12 (92), for example, during a context switch performed by scheduler 24. Upon removing thread 34A from run queue 28, monitoring module 36 determines whether thread 34A is monitored (94). For instance, monitoring module 36 may perform this determination in the same manner as described with respect to element 82 of FIG. 4.

If thread 34A is monitored (98), monitoring module 36 records a removal time of thread 34A from run queue 28 in the thread structure that represents thread 34A (100). If thread 34A is not monitored (96), monitoring module 36 does not record a removal time. In the current example, thread 34A is monitored and therefore monitoring module 36 determines an amount of time that thread 34A is stored on run queue 28. For instance, monitoring module 36 may calculate a difference between the insertion time and removal time of thread 34A from run queue 28.

Upon calculating the amount of time thread 34A is stored on run queue 28, monitoring module 36 determines if the amount of time the monitored thread is stored on the queue is greater than or equal to a specified threshold (104). In some examples, a threshold may be threshold value specified by a user and/or software or hardware component. If the amount of time thread 34A is stored on run queue 28 is greater than or equal to the threshold value, monitoring module 36 sends a notification to a notification listener (110). The notification may include but is not limited to data that indicates the threshold was satisfied, the difference between the removal time and the start time, and data usable to identify the monitored thread (108).

In some examples, the notification listener is a part of or includes a logging software resource. In such examples, the notification listener logs information based on the notification. In other examples, the notification listener is included in prioritization module 38. Upon receiving the notification, prioritization module 38 may modify the priority of thread 34A. For instance, prioritization module 38 may increase the priority of thread 34A to improve the responsiveness of thread 34A. Finally, if the amount of time the monitored thread is stored on the queue is greater than or equal to a specified threshold (106), no notification is sent to the notification listener.

Various embodiments of the invention have been described. These and other embodiments are within the scope of the following claims.

The invention claimed is:

1. A method comprising:
storing, by a kernel of an operating system executing on a computing device, a flag associated with a monitored thread that causes the kernel to determine an amount of time that the monitored thread is stored on a queue, wherein the queue is at least one of a run queue or a sleep queue, wherein the queue stores a plurality of threads scheduled by the operating system for execution, the plurality of threads comprising the monitored thread and at least one thread that is not monitored;
inserting, by the kernel of the operating system executing on the computing device, the monitored thread into the queue comprising the plurality of threads and recording an insertion time that the monitored thread is inserted into the queue;
detecting, by the kernel of the operating system executing on the computing device, an event to remove the monitored thread from the queue;
responsive to detecting the event, removing, by the kernel of the operating system, the monitored thread from the queue;
responsive to removing the monitored thread, determining, by the kernel of the operating system executing on the computing device, an amount of time that the monitored thread is stored on the queue based on the insertion time and a removal time at which the monitored thread was removed from the queue, wherein determining the amount of time, by the kernel, comprises computing the amount of time to exclude time associated with system events comprising interrupts and memory allocations, from the amount of time the monitored thread is on the queue; and
when the amount of time the monitored thread is stored on the queue is greater than or equal to a performance threshold, sending a notification to a notification listener to indicate a potential performance problem within the computing device.

2. The method of claim 1, wherein determining, by the kernel of the operating system executing on the computing device, the amount of time that the monitored thread is stored on the queue based on the insertion time and the removal time at which the monitored thread was removed from the queue further comprises:
determining, by the computing device, a difference between the insertion time and the removal time, and wherein the amount of time that the monitored thread is stored on the queue comprises the difference between the insertion time and the removal time.

3. The method of claim 1, wherein the event is a second event, the method further comprising:
detecting, by the kernel of the operating system executing on the computing device, a first event from a software resource that indicates the software resource includes a thread to monitor; and
wherein storing the flag associated with the monitored thread that causes the kernel to determine the amount of time that the monitored thread is stored on the queue comprises:
responsive to detecting the first event, modifying, by the kernel of the operating system executing on the computing device, a thread structure of the monitored thread that causes the kernel to determine the amount of time that the monitored thread is stored on the queue.

4. The method of claim 1, further comprising:
storing, by the computing device, the insertion time in a thread structure that represents the monitored thread; and
storing, by the computing device, the removal time in the thread structure that represents the monitored thread.

5. The method of claim 1, further comprising:
receiving the notification; and
responsive to receiving the notification, increasing, by the kernel of the operating system executing on the computing device, a priority of the monitored thread.

6. The method of claim 5, wherein the notification comprises at least one of data that indicates the amount of time the monitored thread is stored on the queue is greater than or equal to the performance threshold, the difference between the removal time and the start time, or data that identifies the monitored thread.

7. The method of claim 1,
wherein the amount of time is a first amount of time, and if the queue is a sleep queue:
determining a sum of a threshold value and a sleep time, the sleep time indicating a second amount of time that the monitored thread is stored on the sleep queue; and
determining that the first amount of time that the monitored thread is stored on the queue is greater than or equal to the performance threshold if the difference between the removal time and the start time is greater than or equal to the sum.

8. A computing device comprising:
a control unit having one or more hardware-based microprocessors; and
an operating system executable by the microprocessors to provide an operating environment for a user software application,
wherein the operating system comprises a scheduler module and a monitoring module executing within a kernel space of the operating system,
wherein the monitoring module stores a flag associated with a monitored thread that causes the operating system to determine an amount of time that the monitored thread is stored on a queue, wherein the queue is at least one of a run queue or a sleep queue, wherein the queue stores a plurality of threads scheduled by the operating system for execution, the plurality of threads comprising the monitored thread and at least one thread that is not monitored;
wherein the scheduler module inserts the monitored thread of the user software application into the queue comprising the plurality of threads and records an insertion time that the monitored thread was inserted into the queue;
wherein the scheduler module of the operating system detects an event to remove the monitored thread from the queue;
wherein, responsive to detecting the event, the scheduler module of the operating system removes the monitored thread from the queue;
wherein, responsive to the scheduler module removing the monitored thread, the monitoring module of the operating system determines an amount of time that the monitored thread is stored on the queue based on the insertion time and a removal time at which the monitored thread was removed from the queue, wherein determining the amount of time comprises computing the amount of time to exclude time associated with system events comprising interrupts and memory allocations, from the amount of time the monitored thread is on the queue; and
wherein when the amount of time the monitored thread is stored on the queue is greater than or equal to a performance threshold, the monitoring module sends a notification to a notification listener to indicate a potential performance problem within the computing device.

9. The computing device of claim 8, wherein the monitoring module determines a difference between the insertion time and the removal time, and wherein the amount of time that the monitored thread is stored on the queue comprises the difference between the insertion time and the removal time.

10. The computing device of claim 8, wherein the event is a second event,
wherein the scheduling module detects a first event from a software resource that indicates the software resource includes a thread to monitor; and
wherein the monitoring module responsive to detecting the first event, modifies a thread structure of the monitored thread to cause the monitoring module to determine the amount of time that the monitored thread is stored on the queue.

11. The computing device of claim 8,
wherein the monitoring module stores the insertion time in a thread structure that represents the monitored thread; and
wherein the monitoring module stores the removal time in the thread structure that represents the monitored thread.

12. The computing device of claim 8, further comprising:
a prioritization module executable by the control unit,
wherein responsive to receive the notification, the prioritization module increases a priority of the monitored thread.

13. The computing device of claim 12, wherein the notification comprises at least one of data that indicates the amount of time the monitored thread is stored on the queue is greater than or equal to the performance threshold, the difference between the removal time and the start time, or data that identifies the monitored thread.

14. The computing device of claim 8,
wherein the amount of time is a first amount of time, and if the queue is a sleep queue:
determine a sum of a threshold value and a sleep time, the sleep time indicating a second amount of time that the monitored thread is stored on the sleep queue; and
determine that the first amount of time that the monitored thread is stored on the queue is greater than or equal to the performance threshold if the difference between the removal time and the start time is greater than or equal to the sum.

15. A system comprising:
an operating system;
a software resource; and
a control unit having one or more hardware-based microprocessors configured to execute the operating system wherein:
an application programming interface (API) of the operating system is configured to receive an event from the software resource that indicates the software resource includes a monitored thread;
a monitoring module of the operating system that is configured to:
responsive to receiving the event via the API, store a flag associated with the monitored thread that causes the operating system to determine an amount of time that the monitored thread is stored on a queue, wherein the queue is at least one of a run queue or a sleep queue, wherein the queue stores a plurality of threads scheduled by the operating system for execution, the plurality of threads comprising the monitored thread and at least one thread that is not monitored;
responsive to removing the monitored thread from the queue, determine an amount of time that the monitored thread is stored on the queue based on an insertion time that the monitored thread is inserted into the queue and a removal time at which the monitored thread was removed from the queue, wherein determining the amount of time comprises computing the amount of time to exclude time associated with system events comprising interrupts and memory allocations, from the amount of time the monitored thread is on the queue; and send a notification to a notification listener, to indicate a potential performance problem within the computing device, when the amount of time the monitored thread is stored on the queue is greater than or equal to a performance threshold.

* * * * *